United States Patent Office 2,940,551
Patented June 14, 1960

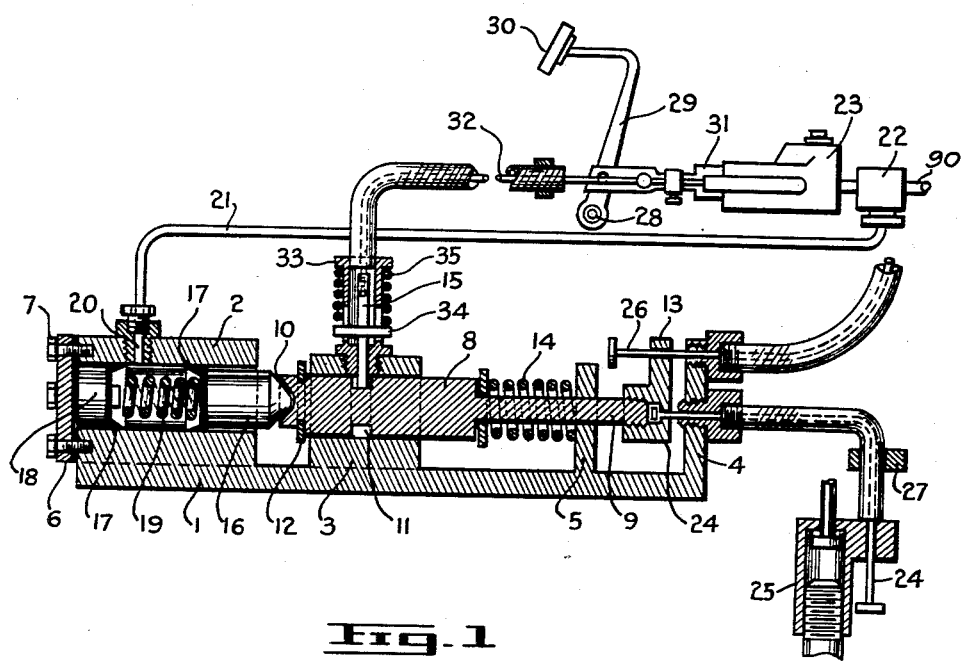
Fig. 1
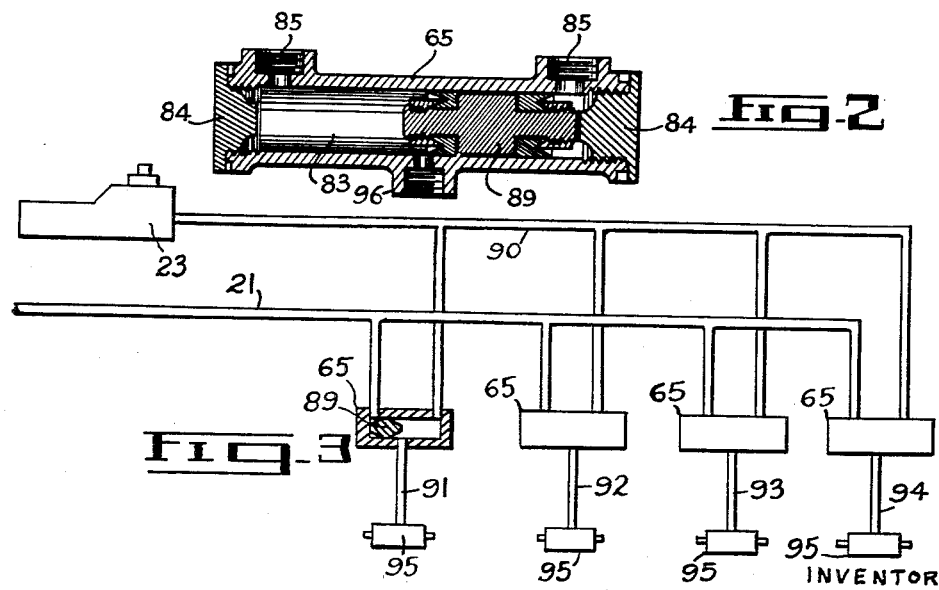
Fig. 2
Fig. 3
INVENTOR
Arthur B. Euga
Schmieding and Fultz
Attorney June 14, 1960
A. B. EUGA
2,940,551
BRAKE SYSTEM FOR VEHICLES
Filed Feb. 8, 1956
4 Sheets-Sheet 2
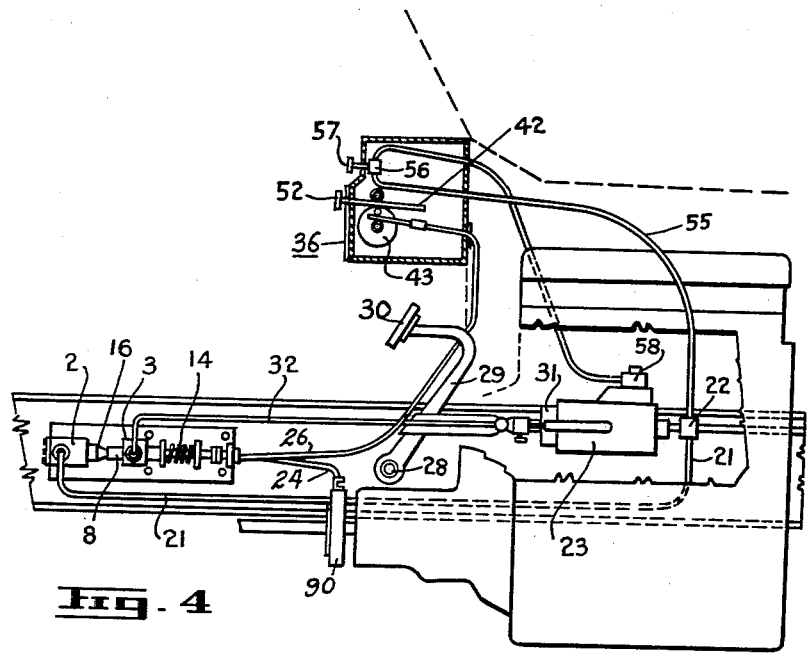
Fig. 4
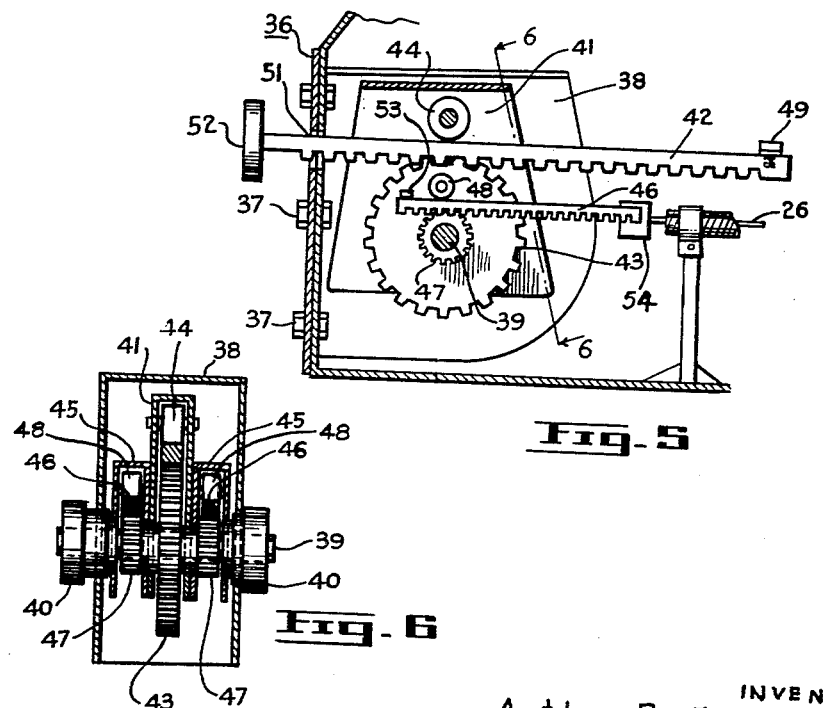
Fig. 5
Fig. 6
INVENTOR
Arthur B. Euga
Schmieding and Fultz
Attorney

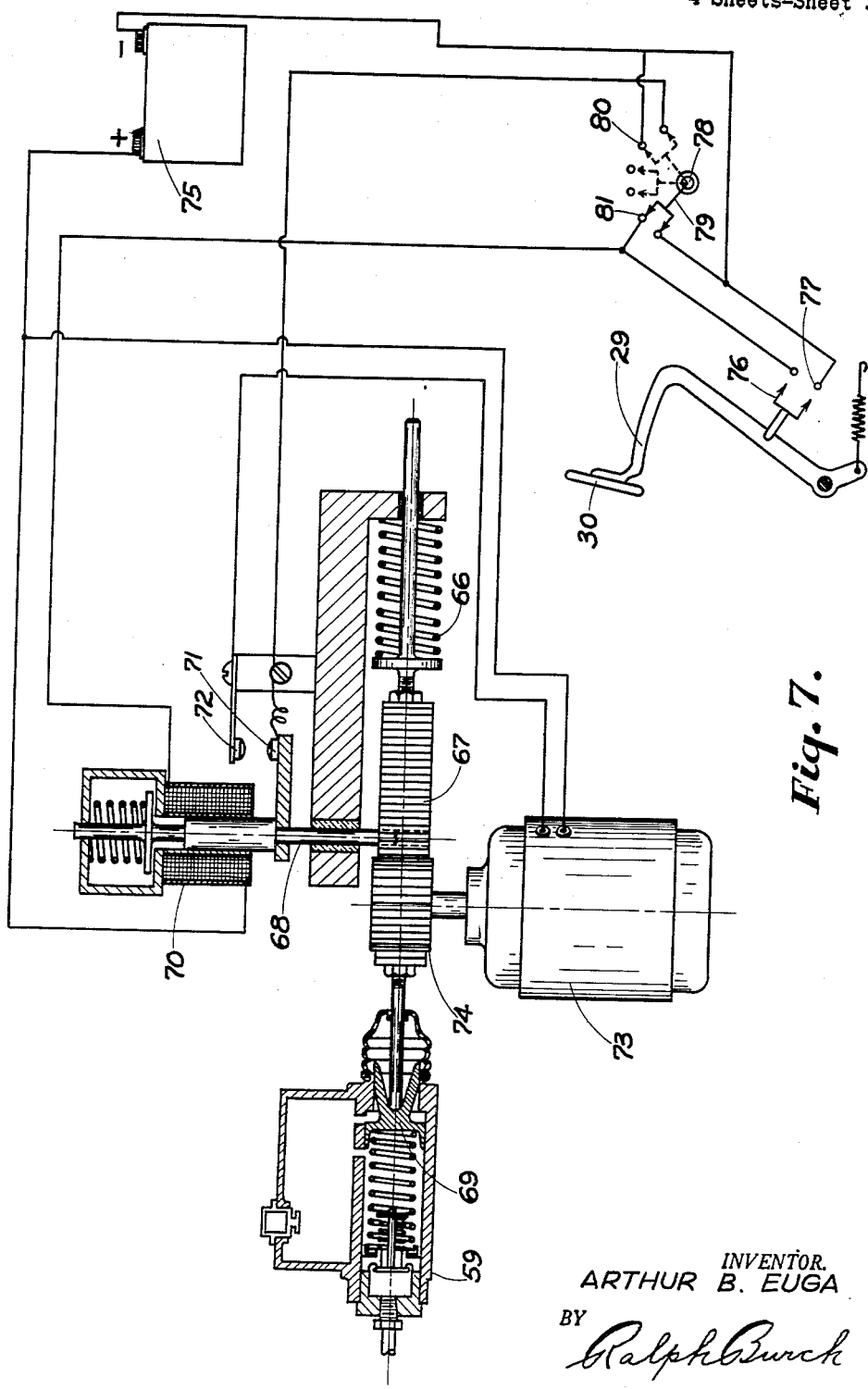

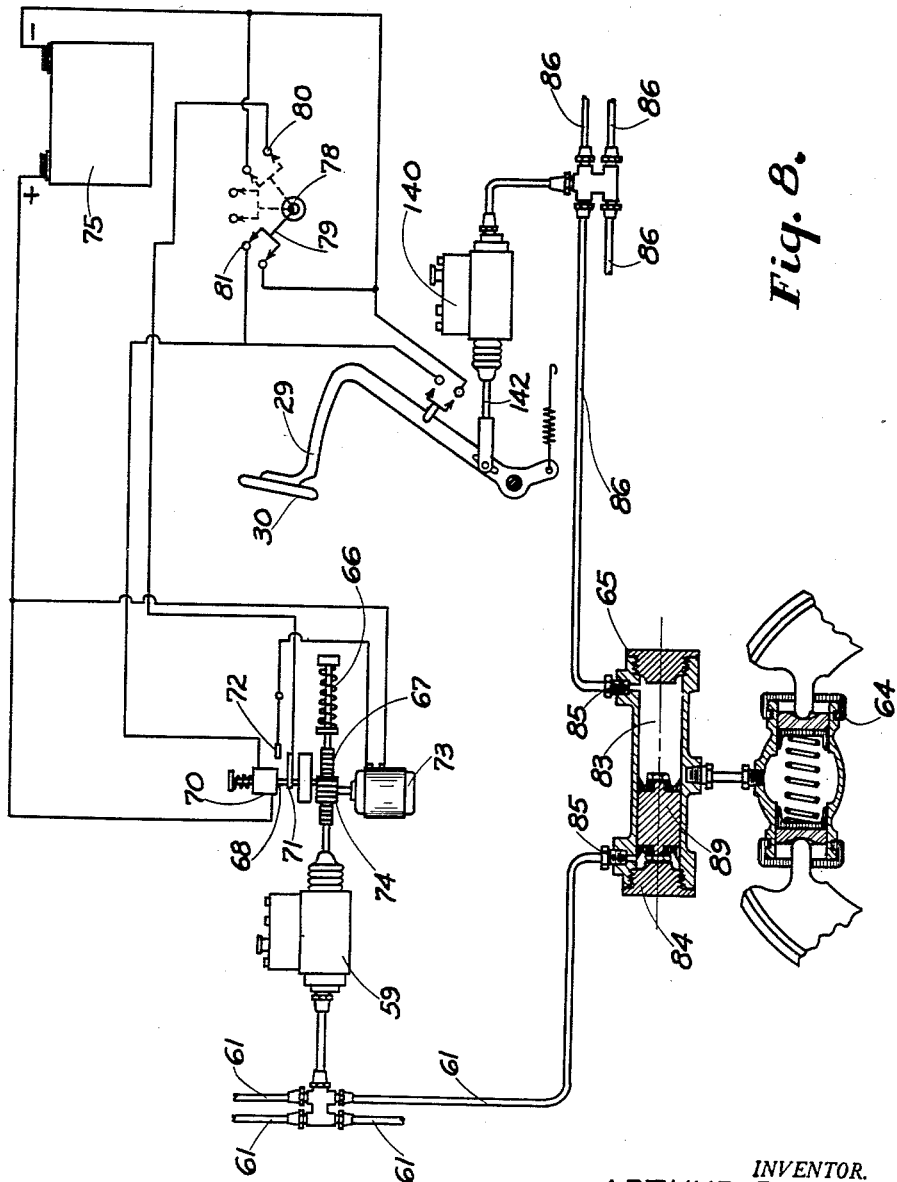

---

2,940,551

BRAKE SYSTEM FOR VEHICLES

Arthur B. Euga, 728½ Franklin Ave., Columbus, Ohio

Filed Feb. 8, 1956, Ser. No. 564,281

12 Claims. (Cl. 188—106)

This invention relates to improvements in braking systems for motor vehicles and more particularly to an auxiliary braking system therefor which is automatically actuable upon failure of the usual service braking means.

This application is a continuation-in-part of my copending application Serial Number 176,785, filed July 31, 1950, now abandoned.

Modern motor vehicles are equipped with a fluid actuated service braking system and a so-called parking or emergency braking system. Such a service system, unfortunately, is subject to complete failure upon loss of its operating fluid, as by a broken line or connection in a necessarily closed and sealed system.

One object of the invention, therefore, is the provision of a means for instantly actuating the emergency braking means, upon failure of the service braking means, without any action additional to that required in operating the service braking means.

Yet another object of the invention is the provision of a means for instantly actuating the emergency braking means and instantly supplementing the fluid action of the service braking means, upon partial loss of the serving fluid for the service braking means, without any action additional to that required in operating the service breaking means.

Further objects and advantages of the present invention will be apparent from the following description, reference being had to the accompanying drawings wherein preferred forms of embodiments of the invention are clearly shown.

In the drawing:

Figure 1 is an elevation mainly in section and partly diagrammatic of one embodiment of the invention showing an auxiliary braking control means in connection with the service hydraulic braking system and the so-called parking or emergency mechanical braking system;

Figure 2 is a sectional view showing the interior of a transfer sleeve or valve means comprising a portion of the apparatus of the present invention, with the section being taken along a vertical plane through the longitudinal center line of said transfer sleeve or valve means;

Figure 3 is a diagrammatic view illustrating a portion of a brake system comprising one aspect of the present invention. Figure 3 should be considered along with Figure 1, which figures when considered together illustrate a complete system;

Figure 4 is a diagrammatic view of the apparatus of Figure 1;

Figure 5 is an enlarged sectional view of the resetting or brake releasing mechanism;

Figure 6 is a section taken on the line 6—6 of Figure 5;

Figure 7 is an enlarged diagrammatic view of a portion of the braking system of Figure 8; and Figure 8 is a diagrammatic view of a modified braking system constructed in accordance with the present invention and constituting a second aspect thereof.

Referring more in detail to the drawings in which similar reference characters designate corresponding parts throughout the several views and particularly to Figure 1, the numeral 1 denotes a base plate having a terminal cylinder 2, a medial sleeve bearing 3, a terminal bracket 4 opposite the cylinder 2, and a further bracket 5 intermediate of the bearing 3 and the bracket 4. These members may be formed in a single casting, as shown, or may be an assembly of separate parts secured by any suitable fastening means. The outermost extremity of the cylinder 2 is detachably closed by a cap 6 and securing means 7 which are cap screws. Carried within the bearing 3 is a shaft 8 having a depending portion 9 of smaller section, a concave recess 10 opposite the portion 9, and a peripheral groove 11 intermediate its ends, said shaft 8 being limitedly adapted by a ring 12 and a plate nut 13 to slide to and fro in the bearing 3 in a manner such that the depending portion 9 projects through an aperture in the bracket 5. Disposed about the portion 9 of the shaft 8 between the bracket 5 and the main body portion of the said shaft is a coil spring 14 which normally is held in compression by a latch pin 15 in releasable engagement with the peripheral groove 11 of the shaft 8. Disposed within the cylinder 2 is a slidable piston 16 the external end of which is adapted for alignment with the recess 10 of the shaft 8, like pressure sealing washers 17, a spacing member 18, and a compressed coil spring 19, the latter serving to maintain the piston 16 in contact with the recessed end of the shaft 8.

Detachably connected to the cylinder 2 via a radially disposed passage 20 is a fluid pressure line 21 which extends to and is in communication with the extension fitting 22 of the master hydraulic cylinder 23 which latter may be disposed at any suitable station in the vehicle, but, preferably, is mounted forwardly of the operating control lever therefor.

The depending portion 9 of the shaft 8 is terminally threadably attached by the interiorly threaded plate nut 13 to a control cable 24 which is in loose connection with the usual turnbuckle 25, not fully shown, of the emergency or drive shaft brake 90 of the vehicle. The said portion 9 is further loosely connected by means of the same plate nut 13 to a control cable 26 which extends to a resetting or brake releasing mechanism which preferably is mounted on the inner surface of the dash as shown in Figure 4. The control cables 24 and 26 are carried in conduits of like character which have each one end detachably fixed to the said bracket 4 and have the opposite ends thereof detachably fastened respectively to the turnbuckle 25 and the said resetting mechanism. Clamping members such as denoted at 27 serve to secure the bodies of the said conduits to any suitable supporting structures which are not illustrated in Figure 1, all as according to well known construction.

Pivoted at 28 to any supporting structure not shown is the stem 29 of a lever having a pedal termination 30 above the vehicle floor. The stem 29 has a pivotal connection above the pivot 28 with the external end of the piston rod 31 of the master hydraulic cylinder 23. Secured to the piston rod 31 is one end of a control cable 32 having its opposite end threadably attached to one end of the latch pin 15 which is limitedly slidable up and down in a flanged sleeve 33, the latter being detachably secured to the bearing 3. A transversely extending pin 34 in engagement with like diametrically opposite longitudinal slots formed in the periphery of the sleeve 33, is provided to secure the latch pin 15 within the said sleeve, and to limit the travel therein of the said latch pin. A compressed coil spring 35 which is disposed about the sleeve 33 and below the flange thereof, is used to maintain the latch pin 15 in releasable engagement with the peripheral groove 11 of the shaft 8. The control cable 32 is carried in a clamped conduit similar to that heretofore described for the control cables 24 and 26.

While the hydraulic means described is shown in connection with the master cylinder of the hydraulic braking system it may be readily applied to individual wheel brakes through separate lines and transfer sleeves thereby constituting a third brake system. Such a transfer sleeve 65 is illustrated in Figure 2 of the drawings and constitutes a member having a cylinder 83 formed in the interior thereof which cylinder is closed by end plugs 84. An element 89 is slideably carried in cylinder 83 and may be provided with cup-shaped seals on the ends thereof in the manner illustrated. One end of element 89 is exposed to fluid entering cylinder 83 through one of the intake ports 85 and the other end of element 89 is exposed to fluid entering cylinder 83 through the other of the intake ports of 85. Hence it will be understood that member 89 will be shifted to the right position illustrated when the pressure of fluid entering the transfer sleeve through the left intake port 85 exceeds the fluid pressure entering the cylinder 83 through the right intake port 85. In such right position, illustrated, the left intake port 85 communicates with an outlet port 96. In a like manner, when the fluid pressure on the right side of element 89 exceeds the fluid pressure on the left side of element 89 such element is moved to the left and righ intake port 85 is placed in communication with outlet port 96.

Reference is next made to Figure 3 which illustrates a modification of the present invention similar to that of Figure 1 except that the automatic auxiliary hydraulic system is connectable to individual wheel brakes through separate lines and transfer sleeves. As seen in Figure 3, four brake actuating cylinders 95 are illustrated. Each of said cylinders may be of a conventional type, well known to those skilled in the art, such as the wheel cylinders that are disposed between conventional arcuate brake shoes for expanding same against a brake drum. Each of the brake cylinders 95 communicates with a respective transfer sleeve 65 via a respective line 91—94. Each of the transfer sleeves 65 has one intake port communicating with main cylinder 23, Figure 1, via line 90. The other intake port of each of the transfer sleeves 65 communicates with the interior of cylinder 2, Figure 1, via line 21. In operation of the system of Figure 3, so long as normal fluid pressure exists in main master cylinder 23 and line 90 the shiftable element 89 of transfer sleeve 65 is maintained in the left position, Figure 3, by fluid pressure such that lines 91, 92, 93, and 94 leading to brake cylinders 95 communicate with line 90. Upon failure, however, of master cylinder 23 or line 90, the drop in fluid pressure in the main hydraulic system will cause the apparatus of Figure 1 to operate, in the manner previously described, whereby cylinders 2 and line 21 are pressurized. When this occurs shiftable elements 89 of transfer sleeve 65 are moved to the right, from the left position of Figure 3, by fluid pressure and lines 91, 92, 93, and 94, leading to brake cylinders 95, are placed in fluid communication with line 21 and the brake cylinders 95 are actuated by the auxiliary fluid circuit.

Means for resetting the control means are provided and comprises an additional mechanism as shown in Figures 4, 5, and 6. 36 designates a bracket which may be secured to the dashboard of a vehicle and to which is rigidly secured, by bolts 37, a channel frame 38. Carried within the frame 38 and rigidly secured thereto by a fixed shaft 39 having terminal hubs 40 is a rack and pinion assembly comprising a U-shaped hanger 41 having an inwardly disposed master rack 42 in engagement with a master pinion 43 and a pivotally mounted guide roller 44, and like U-shaped hangers 45 having like inwardly disposed racks 46 in engagement with like hubbed pinions 47 and like pivotally mounted guide rollers 48, all said pinions being revolvably mounted as one on the shaft 39, said hangers 45 being rigidly secured to the said hanger 41 by any suitable fastening means, e.g. rivets.

One end of the rack 42 is provided with a stop member 49 which may be a screw while the opposite end thereof is extendable through an aperture 51 in the frame 38 and bracket 36 and is terminated above the dash with a detachably secured knob 52.

The like racks 46 are provided with rearward terminal stop members 53 and are detachably secured at the forward extremities thereof to a bar 54 to which is attached the reset control cable 26 heretofore described.

A fluid conveying line 55 having one end threadably attached to the extension fitting 22 of the master hydraulic cylinder 23 is provided with a standard control valve 56 having a shafted knob 57 mounted on the dash structure by bracket 36, and its opopsite end is connected to the filler cap opening 58 of the said master cylinder 23.

The embodiment described is automatic in operation and is actuated as hereinafter described without any action additional to that required in operating the hydraulic service or foot pedal braking system.

It is apparent that the latch pin 15 will be withdrawn by a downward and continued movement of the pedal termination 30 of the pivoted stem 29, and the shaft 8 is thereby released. Thus the energy stored in the compressed spring 14 will be imparted through the shaft 8 to the piston 16 tending to force the piston into the cylinder 2. In an adequately served fluid system this force is countered and overcome by the outward displacement force exerted on the inner face of the piston 16 through the master cylinder communicating line 21 and no additional braking action can occur, the latch pin 15 being simply reseated in the groove 11 of the shaft 8 by the spring 35 upon removal of foot pressure from the pedal 30.

If, however, there has been a total loss of fluid action in the hydraulic service braking system as by a leaking connection, or if the system is inadequately served with operating fluid, little or no countering displacement force is exerted on the piston 16 and it is forced within the cylinder 2 by the released energy of the spring 14.

Thus the emergency mechanical braking system may be instantly lockingly applied through the control cable 24 and the fluid action of an inadequately served system supplemented by the sudden inward displacement of the piston 16.

The system may be reset and the brakes released for subsequent actuation by pulling on the knob 52 of the master rack 42 which being effectively coupled to the hubbed pinions 47 and associated racks 46, through the master pinion 43 actuates the control cable 26 thus retracting the shaft 8 until the latch pin 15 is reseated in the groove 11 by the coil spring 35.

The system may be used as a parking brake proof against the depredations of children passengers by neutralizing the hydraulic service braking system through an operation of the dash mounted control valve 56. This is accomplished by manipulating valve handle 57 to open control valve 56 and by depressing pedal lever 29. Fluid is thereby expelled from the pressure cylinder within master cylinder 23, through line 55, and thence into the reservoir of master cylinder 23. Since the pressure cylinder within the master cylinder 23 is not pressurized since control valve 56 is open, cable 32 will pull transversely extending pin 34 from the position of locked engagement with slot 11, Figure 1, whereby compressed spring 14 will apply tension to cable 24 which in turn will apply the conventional emergency or drive shaft brake 90 of the vehicle. Hence it will be understood that the only way the emergency brake can thereafter be released is by operating the previously described resetting mechanism, or by closing valve 56 and actuating pedal 30 to pressurize master cylinder 23. Plunger 16 will move to the right, Figure 1, with the result that spring 14 is compressed and the tension released from cable 24 and the drive shaft brake 90 is thereby released.

Reference is next made to Figures 7 and 8 which illustrate another brake system constructed according to the present invention. In Figures 7 and 8, 59 denotes a master hydraulic cylinder, having alternative extending fluid lines 61, each of which is in communication with a respective transfer sleeve or valve means, one of which is illustrated at 65. Transfer sleeve 65 includes a valve element 89 shaftably mounted in a valve cylinder. The piston 69 of master cylinder 59 is adapted for actuation by a releasably secured and compressed coil spring 66, the latter being adapted so as to impart its energy through a slidably mounted rack 67 which is releasably secured by a spring returned latch pin 68, to the piston 69 of the master cylinder 59.

As best seen in Figure 7, latch pin 68 is adapted in a manner such that it may be used as the plunger of armature of an electrically energizable solenoid 70. Secured to the latch pin 68 is a part 71 which is usable as the movable contacting element of a normally open single pole switch for which 72 is the fixed contacting element, said movable and fixed elements being in the circuit of an electric motor 73 having a shafted pinion 74 in engagement with the slidably mounted rack 67, said motor being provided for resetting the brake control means after each actuation thereof. Power for energizing the solenoid 70 and the motor 73 may be obtained from the usual electrical system of the vehicle or from a separate source, e.g., a battery 75, as shown.

Medially secured to the pivoted foot lever 29 is a part 76 which is usable as the movable contacting element of a single pole shorting type switch for which 77 are the fixed contacting elements, said movable and fixed elements being in the electrical circuit of the solenoid 70 and power source 75.

A single pole double throw shorting type drum switch having suitable control means mounted above the vehicle dash structure, includes a revolvable drum 79 as its movable contacting element, fixed contacting elements 80 in circuit with the resetting motor 73, and fixed contacting elements 81 in circuit with the solenoid 70 and in parallel connection with the fixed contacting elements 77 of the pedal switch, is provided for alternative use as a resetting control switch or as a manual (hand) actuating control switch. The said drum switch is provided with a natural "off" position.

During normal operation of the vehicle the switch 78 is centered, as seen in the figures, with the contacts 80 and 81 open so that solenoid 70 is not energized. Hence closing of conatcts 77 by element 76 on lever 29 will energize solenoid 70 to actuate the master cylinder 59 of the emergency system. It will be noted that resetting motor 73 will remain inoperative, even though contacts 71 and 72 are closed by solenoid 70, until the contacts 80 have been bridged by manual actuation of switch 78.

With reference to the operation of the apparatus, it will be understood from Figures 7 and 8 that a downward and continued movement of the pedal termination 30 of lever 29 will cause the switch part 76 to bridge the fixed contacting elements 77 thus closing the electrical circuit to the solenoid 70. The latch pin 68 is thus retracted by the magnetic field of the solenoid 70 and the rack 67 thereby released. The potential energy of the now released coil spring is imparted to the piston 69 through the slidably mounted rack 67 and the piston 69 is driven into the cylinder 59 causing a displacement of the operating fluid therein to the left side of line transfer sleeve 65. The piston 89 is shifted to the right by fluid pressure and wheel cylinder 64 is placed in commuition with pressurized fluid from auxiliary master cylinder 59.

With reference to Figures 7 and 8, the actuating means of the auxiliary system can be manually operated by switch 78 by causing the conductor 79 to bridge the contacts 81 to energize solenoid 70.

To provide means for resetting the actuating means of the auxiliary system, an electric motor 73 is provided with a pinion 74 which engages a rack 67 connected to the piston 69 of master cylinder 59.

In order to operate resetting motor 73 it is necessary that a movable contact 71 be in engagement with a stationary contact 72 which engagement will occur when solenoid 70 is actuated since movable contact 71 is carried on latch pin 68. It is also necessary, in order to operate motor 73, that the contacts 80 of switch 78 be manually closed. It will therefore be understood that once the auxiliary brake system has been actuated, it is necessary to manually set the switch 78 to bridge contacts 80 before the motor will become energized to reset the actuating mechanism of the auxiliary system While the embodiments of the present invention as herein disclosed constitute preferred forms, it is to be understood that other forms might be adopted, all coming within the scope of the claims which follow.

I claim:

1. A braking system for vehicles comprising, in combination, a fluid energy translating means for pressurizing fluid in a service brake system of said vehicle; actuating means for said fluid energy translating means; a fluid motor for applying braking action at a wheel of said vehicle; means forming a valve cylinder including a first intake port for receiving fluid from said service brake system, a second intake port, and an outlet port communicating with said fluid motor; and a valve element movably carried in said valve cylinder and forming a fluid seal between said two intake ports, said valve element including a first surface exposed to the pressure of fluid entering said first intake port and a second surface exposed to the pressure of fluid entering said second intake port; means forming a chamber of fluid separate from said fluid energy translating means but in pressure responsive communication with said second intake port; a member movably disposed in said chamber in communication with the fluid therein; compressed resilient means forming a source of stored energy for applying force to said movable member to move said member in a direction to pressurize fluid in said chamber; means for releasing energy from said source in response to failure of said fluid energy translating means to produce normal service brake operating pressure during operation of said actuating means in a direction to apply the service brake.

2. A braking system for vehicles comprising, in combination, a fluid energy translating means for pressurizing fluid in a service brake system of said vehicle; actuating means for said fluid energy translating means; a fluid motor for applying braking action at a wheel of said vehicle; means forming a valve cylinder including a first intake port for receiving fluid from said service brake system, a second intake port, and an outlet port communicating with said fluid motor; and a valve element movably carried in said valve cylinder and forming a fluid seal between said two intake ports, said valve element including a first surface exposed to the pressure of fluid entering said first intake port and a second surface exposed to the pressure of fluid entering said second intake port; means forming a chamber of fluid separate from said fluid energy translating means but in pressure responsive communication with said second intake port; a member movably disposed in said chamber in communication with the fluid therein; means operatively connected to said actuating means for applying force to said movable member to move said member in a direction to pressurize fluid in said chamber in response to failure of said fluid energy translating means to produce normal service brake operating pressure during operation of said actuating means in a direction to apply the service brake.

3. The apparatus defined in claim 1 wherein said means forming a source of stored energy includes a first latch portion; and means including a second latch portion releasably engageable with said first latch portion for releasing energy from said source in response to failure of said fluid energy translating means to produce normal service brake operating pressure during operation of said actuating means in a direction to apply the service brake.

4. The apparatus defined in claim 1 wherein said means forming a source of stored energy includes a first latch portion; means including a second latch portion releasably engageable with said first latch portion for releasing energy from said source in response to failure of said fluid energy translating means to produce normal service brake operating pressure during operation of said actuating means in a direction to apply the service brake; and a resetting lever connected to said resilient means for restoring energy to said source subsequent to the operation of said latch portions.

5. A braking system for vehicles comprising, in combination, a fluid energy translating means for pressurizing fluid in a service brake system of said vehicle; actuating means for said fluid energy translating means; a fluid motor for applying braking action at a wheel of said vehicle; a pressure producing member in pressure transmitting communication with the fluid of said service brake system; compressed resilient means forming a source of stored energy for moving said pressure producing member in a direction to pressurize said service brake system; an auxiliary brake system for said vehicle including an operator separate from said actuating means; means so connecting said operator to said means forming a source of stored energy that upon release of the latter the auxiliary brake is applied; and means for releasing energy from said source in response to failure of said fluid energy translating means to produce normal service brake operating pressure during operation of said actuating means in a direction to apply the service brake.

6. A braking system for vehicles comprising, in combination, a fluid energy translating means for pressurizing fluid in a service brake system of said vehicle; actuating means for said fluid energy translating means; a fluid motor for applying braking action at a wheel of said vehicle; means forming a chamber; a pressure producing member in said chamber; means forming a source of stored energy for moving said pressure producing member in a direction to pressurize said service brake system; an auxiliary brake system for said vehicle including an operator separate from said actuating means; means so connecting said operator to said means forming a source of stored energy that upon release of the latter the auxiliary brake is applied; means for releasing energy from said source in response to failure of said fluid energy translating means to produce normal service brake operating pressure during operation of said actuating means in a direction to apply the service brake; and a pressure responsive valve means for connecting said fluid motor either with said service brake system or with said chamber.

7. A braking system for vehicles, comprising, in combination, a fluid energy translating means for pressurizing fluid in a service brake system of said vehicle; actuating means for said fluid energy translating means; a fluid motor for applying braking action at a wheel of said vehicle; a pressure producing member in pressure transmitting communication with the fluid of said service brake system; compressed resilient means forming a source of stored energy for moving said pressure producing member in a direction to pressurize said service brake system, said means including a movable member, one of said members including a latching portion; an auxiliary brake system for said vehicle including an operator separate from said actuating means; means so connecting said operator to said means forming a source of stored energy that upon release of the latter the auxiliary brake is applied; and means including a second latching portion releasably engageable with said first latching portion for releasing said energy from said source in response to failure of said fluid energy translating means to produce normal service brake operating pressure during operation of said actuating means in a direction to apply the service brake.

8. A braking system for vehicles, comprising, in combination, a fluid energy translating means for pressurizing fluid in a service brake system of said vehicle; actuating means for said fluid energy translating means; a fluid motor for applying braking action at a wheel of said vehicle; means forming a chamber; a pressure producing member in said chamber; means forming a source of stored energy for moving said pressure producing member in a direction to pressurize said service brake system, said means including a movable member, one of said members including a latching portion; an auxiliary brake system for said vehicle including an operator separate from said actuating means; means so connecting said operator to said means forming a source of stored energy that upon release of the latter the auxiliary brake is applied; means including a second latching portion releasably engageable with said first latching portion for releasing said energy from said source in response to failure of said fluid energy translating means to produce normal service brake operating pressure during operation of said actuating means in a direction to apply the service brake; and a pressure responsive valve means for connecting said fluid motor either with said service brake system or with said chamber.

9. A braking system for vehicles comprising, in combination, a fluid energy translating means for pressurizing fluid in a service brake system of said vehicle; actuating means for said fluid energy translating means; a fluid motor for applying braking action at a wheel of said vehicle; a pressure producing member in pressure transmitting communication with the fluid of said service brake system; compressed resilient means forming a source of stored energy for moving said pressure producing member in a direction to pressurize said service brake system; an auxiliary brake system for said vehicle including an operator separate from said actuating means; means so connecting said operator to said means forming a source of stored energy that upon release of the latter the auxiliary brake is applied; means for releasing energy from said source in response to failure of said fluid energy translating means to produce normal service brake operating pressure during operation of said actuating means in a direction to apply the service brake; and means for restoring energy to said source subsequent to the operation of said releasing means.

10. Mechanism defined in claim 7 characterized by means for restoring energy to said source subsequent to the operation of said latch portions.

11. The apparatus defined in claim 1 wherein said means for releasing energy from said source includes an electrically actuated latch means.

12. The apparatus defined in claim 5 wherein said means for releasing energy from said source includes an electrically actuated latch means.

References Cited in the file of this patent

UNITED STATES PATENTS

| | | |
|---|---|---|
| 1,750,159 | Broadhurst | Mar. 11, 1930 |
| 1,885,580 | Bradbury | Nov. 1, 1932 |
| 1,991,603 | Dick | Feb. 19, 1935 |
| 2,189,192 | Brock et al. | Feb. 6, 1940 |
| 2,240,166 | Stanly | Apr. 29, 1941 |
| 2,300,694 | Overbeke | Nov. 3, 1942 |
| 2,365,557 | Keith | Dec. 19, 1944 |
| 2,394,343 | Vorech | Feb. 5, 1946 |
| 2,443,642 | Rockwell | June 22, 1948 |
| 2,493,377 | Zeilman | Jan. 3, 1950 |
| 2,539,538 | Hayes | Jan. 30, 1951 |
| 2,544,997 | Keim et al. | Mar. 13, 1951 |

FOREIGN PATENTS

| | | |
|---|---|---|
| 497,226 | Great Britain | Dec. 14, 1938 |